(12) United States Patent
Chun et al.

(10) Patent No.: US 8,908,476 B2
(45) Date of Patent: Dec. 9, 2014

(54) APPARATUS AND METHOD FOR SEABED EXPLORATION

(75) Inventors: Jong Hwa Chun, Daejeon (KR); Hag Ju Kim, Seoul (KR); Byong Jae Ryu, Daejeon (KR); Jang Jun Bahk, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 624 days.

(21) Appl. No.: 13/096,251

(22) Filed: Apr. 28, 2011

(65) Prior Publication Data
US 2012/0204781 A1  Aug. 16, 2012

(30) Foreign Application Priority Data

Feb. 11, 2011 (KR) .................. 10-2011-0012179

(51) Int. Cl.
| | | |
|---|---|---|
| *B63G 8/00* | (2006.01) | |
| *G01V 1/38* | (2006.01) | |
| *G01S 15/00* | (2006.01) | |
| *G05D 1/10* | (2006.01) | |
| *G01S 5/26* | (2006.01) | |

(52) U.S. Cl.
CPC .............. *G05D 1/10* (2013.01); *G01V 1/3852* (2013.01); *G01S 15/003* (2013.01); *B63G 8/001* (2013.01); *G01S 5/26* (2013.01)
USPC ............. 367/131; 114/312; 701/21; 701/408; 701/469

(58) Field of Classification Search
CPC ......... B63G 8/001; G01S 15/003; G01S 5/26; G01S 11/14; G01S 15/876; G01V 1/3852; G05D 1/10
USPC ............ 15/1.7; 37/314, 461; 73/53.01, 64.56; 114/312, 326, 328; 134/21; 210/167.16, 170.1, 416.2; 250/281, 250/282, 288; 294/68.23, 110.1; 299/8; 356/5.01, 130; 367/2, 3, 131; 701/21, 701/408, 469
See application file for complete search history.

(56) References Cited

U.S. PATENT DOCUMENTS

| | | | | |
|---|---|---|---|---|
| 3,934,917 A | * | 1/1976 | Paxton et al. .............. | 294/68.23 |
| 4,311,342 A | * | 1/1982 | Latimer ........................ | 299/8 |

(Continued)

FOREIGN PATENT DOCUMENTS

WO   WO2011017734 A1 *  2/2011  ............... G01N 1/10

OTHER PUBLICATIONS

Valentine, et al., Characterization of epibenthic and demersal megafauna at Mississippi Canyon 252 shortly after the Deepwater Horizon Oil Spill, Marine Pollution Bulletin, 2013, pp. 109-209, vol. 77, Baton Rouge, LA.

(Continued)

*Primary Examiner* — Daniel L Murphy
(74) *Attorney, Agent, or Firm* — The Webb Law Firm

(57) ABSTRACT

Provided are an apparatus and a method for seabed exploration using an unmanned remotely operated vehicle. The apparatus for seabed exploration of the present invention includes: an unmanned remotely operated vehicle connected with a ship 2 by a cable 1; a transponder of an acoustic positioning system mounted on the unmanned remotely operated vehicle; a pinger mounted on the unmanned remotely operated vehicle and outputting a signal that is received by a receiver of an echo sounder system mounted on the ship; a measuring device mounted on the unmanned remotely operated vehicle and sensing or measuring various information on the seabed where the unmanned remotely operated vehicle is positioned; and a sediment collecting device collecting sediments of the seafloor, when the unmanned remotely operated vehicle grounds on the seafloor.

9 Claims, 7 Drawing Sheets

(56) References Cited

U.S. PATENT DOCUMENTS

| | | | | |
|---|---|---|---|---|
| 6,017,400 | A * | 1/2000 | Clark et al. | 134/21 |
| 8,109,223 | B2 * | 2/2012 | Jamieson | 114/312 |
| 8,299,424 | B2 * | 10/2012 | Camilli | 250/288 |
| 8,442,709 | B2 * | 5/2013 | Larkin et al. | 701/21 |
| 2008/0165617 | A1 * | 7/2008 | Abbot et al. | 367/3 |
| 2010/0141928 | A1 * | 6/2010 | Embry | 356/5.01 |

OTHER PUBLICATIONS

Sonardyne International Limited, Construction Survey Positioning Systems Wideband Fusion LBL and USBL, Wideband Fusion LBL and USBL Precise, robust, low risk, United Kingdom, Mar. 2006, pp. 1-11, United Kingdom.

Edge-Tech, Underwater Tracking & Positioning, http://www.edgetech.com/docs/EdgeTech-USBL-Brochure-040113.pdf, Apr. 1, 2013, pp. 1-3, USA.

Morgado, et al., Attitude Estimation for Intervention-AUVs Working in Tandem With Autonomous Surface Craft, European Journal of Control, 2012, pp. 485-495, vol. 5, European Control Association (EUCA).

McPhail, Autosub6000: A Deep Diving Long Range AUV, Journal of Bionic Engineering, 2009, pp. 55-62, vol. 6, Science Direct, United Kingdom.

Sager, et al., Geophysical signatures of mud mounds at hydrocarbon seeps on the Louisiana continental slope, northern Gulf of Mexico, Marine Geology, Feb. 13, 2003, pp. 97-132, vol. 198, Scient Direct, Elsevier Science B.V.

* cited by examiner

APPARATUS AND METHOD FOR SEABED EXPLORATION

CROSS-REFERENCE TO RELATED APPLICATIONS

This application claims priority under 35 U.S.C. §119 to Korean Patent Application No. 10-2011-0012179, filed on Feb. 11, 2011, in the Korean Intellectual Property Office, the disclosure of which is incorporated herein by reference in its entirety.

TECHNICAL FIELD

The present invention relate to an apparatus for seabed exploration for checking whether seabed resources, such as a gas hydrate, exists or not or investigating seabed environment, and more particularly, to an apparatus for seabed exploration using a remotely operated vehicle.

BACKGROUND

Various types of apparatus for seabed exploration have been proposed to develop seabed resources or investigate seabed environment and most of them have a remotely operated vehicle, while most apparatuses for seabed exploration used for deep sea use unmanned remotely operated vehicle.

Manned remotely operated vehicles require a relatively large amount of manufacturing and operational cost and have a danger of causing human safety accidents, as compared with unmanned remotely operated vehicles.

Various types of unmanned remotely operated vehicles are recently used to explore the seabed and establish and develop seabed facilities for those reasons.

The unmanned remotely operated vehicles have a large difference in manufacturing and operational cost, in accordance with the types of cables connected with the ship (mother ship of the remotely operated vehicles).

When the ship and the unmanned remotely operated vehicle are connected by a communication cable, communication is possible between the ship and the unmanned remotely operated vehicle, such that underwater works become convenient.

However, a relatively large amount of cost is required, because a device for the communication between the ship and the unmanned remotely operated vehicle under the sea is required.

Further, the ship requires to be equipped with measuring device for remote control of investigation measuring device mounted in the unmanned remotely operated vehicle and the remote control measuring device is installed, such that there is a problem in that the working space becomes narrow.

When a cable, not the communication cable, is connected between the ship and the unmanned remotely operated vehicle, although communication is impossible between the ship and the unmanned remotely operated vehicle, the cost is very low, which is economically advantageous.

However, since communication is impossible between the unmanned remotely operated vehicle and the ship, it is possible to move the unmanned remotely operated vehicle by moving the ship, but it is impossible to control various devices in the unmanned remotely operated vehicle from the ship, such that there is considerable inconvenience in investigation work and it is difficult to ensure accuracy in the work.

Further, it is difficult to find the accurate position of the unmanned remotely operated vehicle (the latitudinal and longitudinal positions and the underwater depth) from the ship, such that the available field is limited (the unmanned remotely operated vehicle released under the sea is moved away from the released position by various causes, such as the current, such that the released position (latitudinal and longitudinal positions) and the released length of the cable are very different from the position of the unmanned remotely operated vehicle released under the sea (latitudinal and longitudinal positions) and the underwater depth).

In detail, for example, a gas hydrate, which is a pure energy source that may replace the fossil fuel in the twenty-first century, is a solid energy source formed by combining with water under low temperature and high pressure in the permafrost or the deep sea, and is similar in external shape to the dry ice and has a property of being burned by fire, such that it is also called a burning ice (the main component of the gas hydrate is methane gas).

Since methane gas is discharged when there is a gas hydrate described above in the seafloor, it is possible to check whether there is a gas hydrate by releasing an investigation apparatus and measuring the concentration of methane gas under the sea (the methane gas may be discharged to the sea by natural dissociation of the gas hydrate and manmade dissociation (development and production)). Further, the methane gas is also made by activity of submarine volcanoes or dissolution of organic substances near the coast (harbor).

However, it is required to be able to relatively accurately find the accurate position (latitudinal and longitudinal positions and underwater depth) of the investigation device, such as an unmanned remotely operated vehicle released under the sea, from the ship, in order to check whether there is a gas hydrate described above.

This is because it is required to position a device measuring the concentration of the methane gas, such as methane gas measuring device, close to the seafloor (at 1 m~2 m above from the seafloor) in order to find there is a gas hydrate, for ensuring accuracy.

However, since it is impossible to find the position (latitudinal and longitudinal positions and underwater depth) of the unmanned remotely operated vehicle released under the sea by a cable, from the ship, it is impossible to investigate whether there is a gas hydrate through the cable.

On the other hand, the unmanned remotely operated vehicle released under the sea by the cable is not equipped with a device that collects seabed sediments, such that it is impossible to collect seabed sediments.

SUMMARY

An embodiment of the present invention is directed to provide an apparatus for seabed exploration that may be used for exploration works for checking whether there is a gas hydrate while using an unmanned remotely operated vehicle connected with a ship by a cable by relatively accurately finding the position of the unmanned remotely operated vehicle from the ship (latitudinal and longitudinal positions and underwater depth), and may collect seabed sediments, if necessary.

An apparatus for seabed exploration according to an exemplary embodiment of the present invention is used for seabed exploration works for checking whether there is a gas hydrate by mounting a transponder of an acoustic positioning system and a pinger of an echo sounder system on an unmanned remotely operated vehicle and releasing the unmanned remotely operated vehicle connected with a ship by a cable under the sea such that the position of the descending unmanned remotely operated vehicle is relatively accurately found in the seabed.

Further, it is possible to acquire more various pieces of information by making it possible to collect seabed sediments, by using a sediment collecting device that collects sediments on the seafloor, when the unmanned remotely operated vehicle grounds on the seafloor.

The apparatus for seabed exploration of the present invention may have the unmanned remotely operated vehicle connected with a ship by a cable.

Further, the apparatus may have a transponder of an acoustic positioning system mounted on the unmanned remotely operated vehicle.

Further, the apparatus may have a pinger mounted on the unmanned remotely operated vehicle and outputting a signal that may be received by a receiver of an echo sounder system mounted on the ship.

Further, the apparatus may have a measuring device mounted on the unmanned remotely operated vehicle and sensing or measuring various information on the seabed where the unmanned remotely operated vehicle is positioned.

Further, the apparatus may have a sediment collecting device collecting sediments on the seafloor when the unmanned remotely operated vehicle grounds on the seafloor.

Other features and aspects will be apparent from the following detailed description, the drawings, and the claims.

[Detailed Description of Main Elements]

Figure 1:
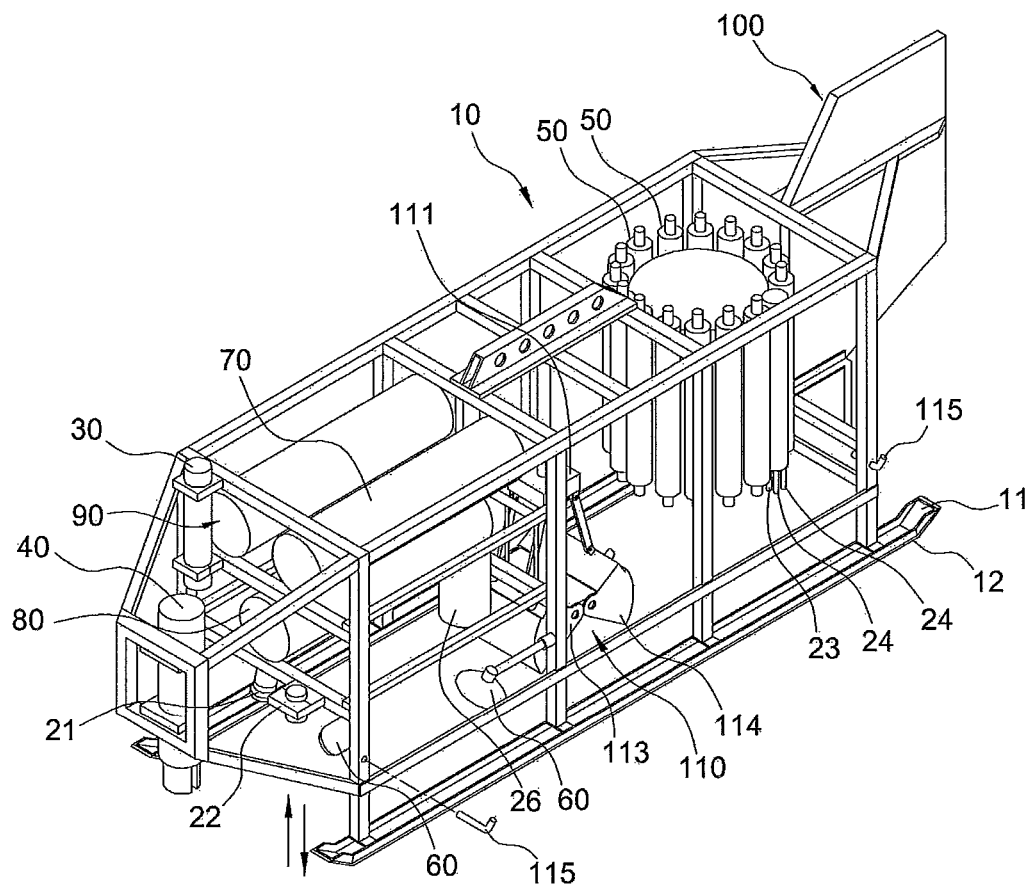
FIG. 1 is a perspective view of an apparatus for seabed exploration of the present invention.
Figure 2:
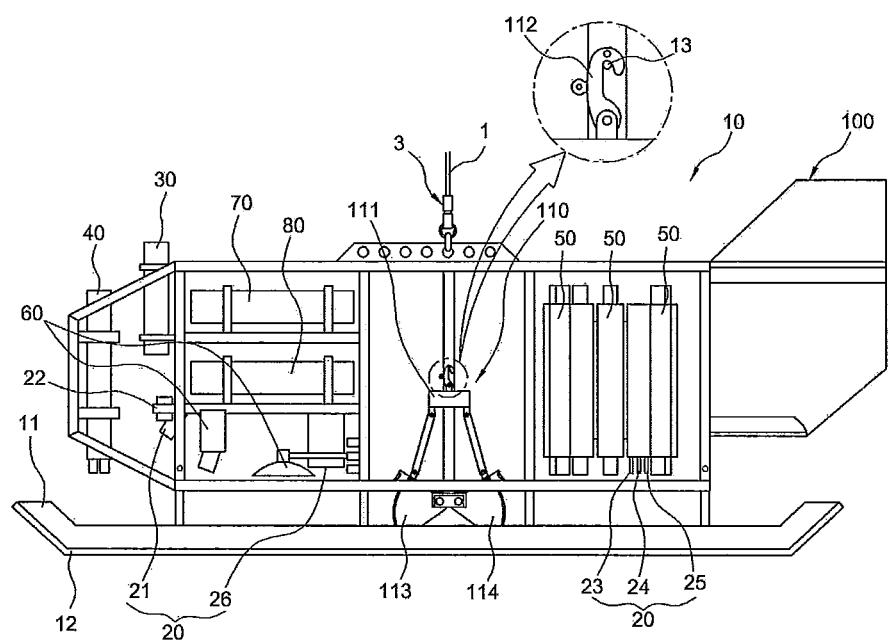
FIG. 2 is a front view of an apparatus for seabed exploration of the present invention.
Figure 3:
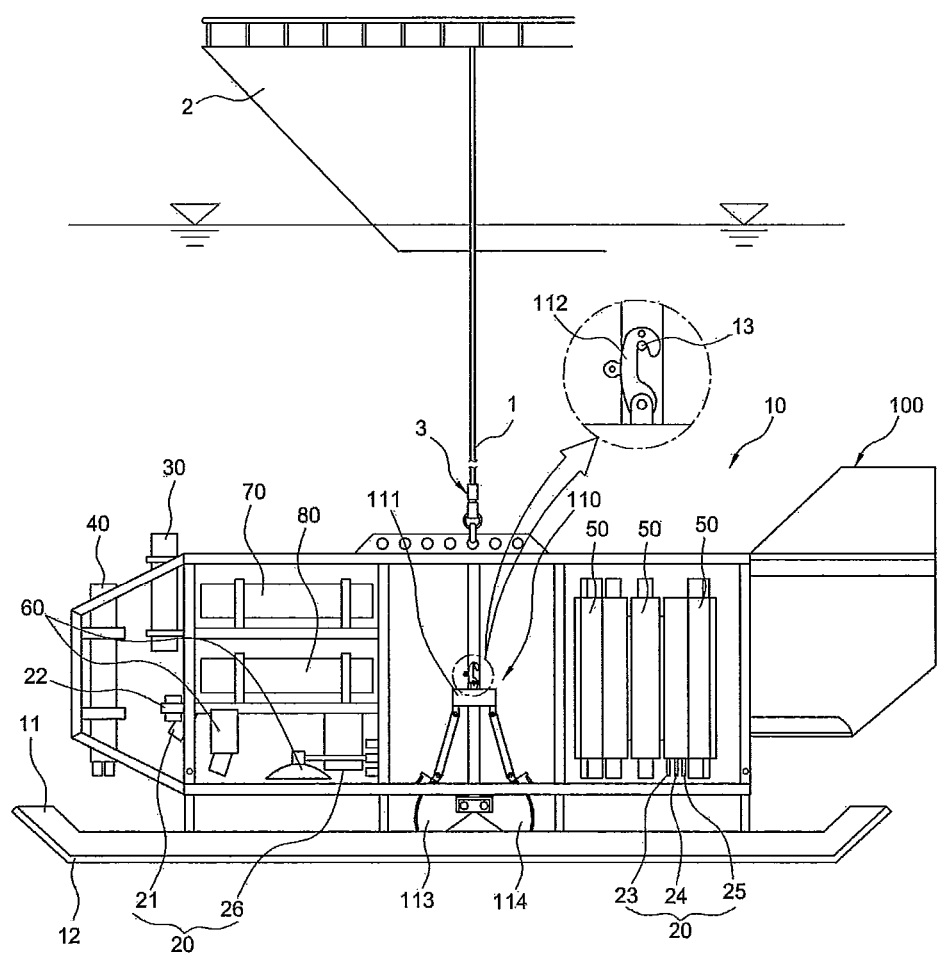
FIG. 3 is a schematic view showing the use of the apparatus for seabed exploration of the present invention.
Figure 4:
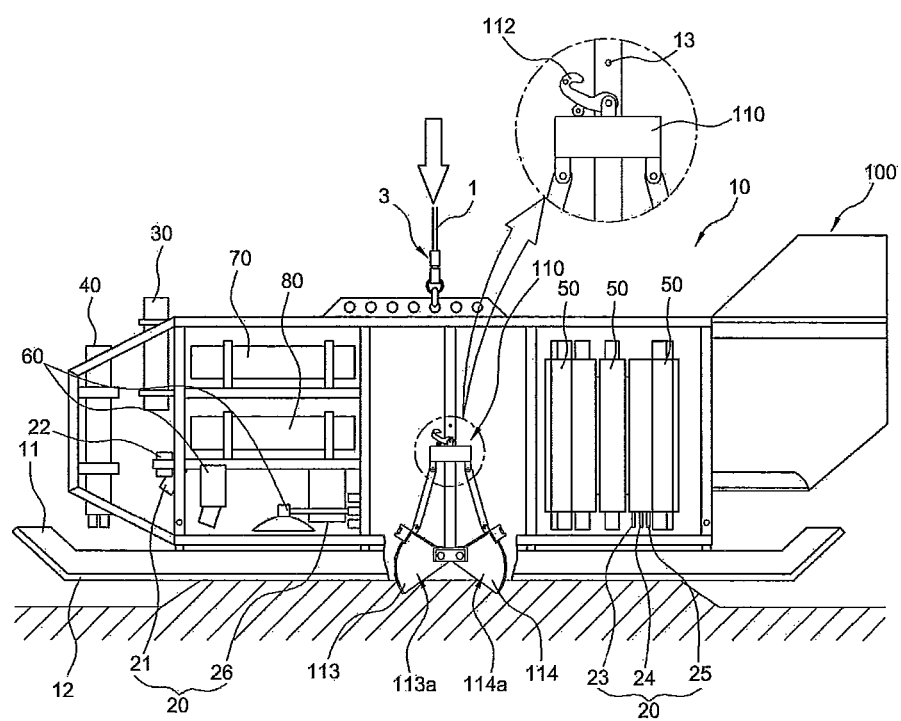
FIG. 4 is a schematic view showing the early stage when the apparatus for seabed exploration of the present invention grounds on a place for collecting seabed sediments and collects seabed sediments.
Figure 5:
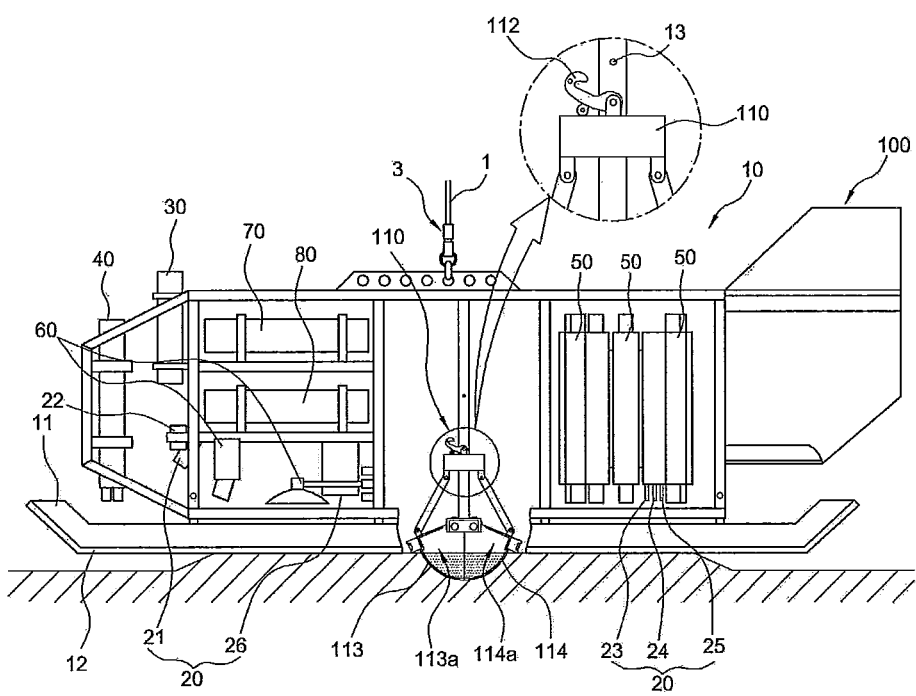
FIG. 5 is a schematic view showing the apparatus for seabed exploration that has been considerably rotated such that a left rotary bucket and a right rotary bucket face each other, after the process of FIG. 4.
Figure 6:
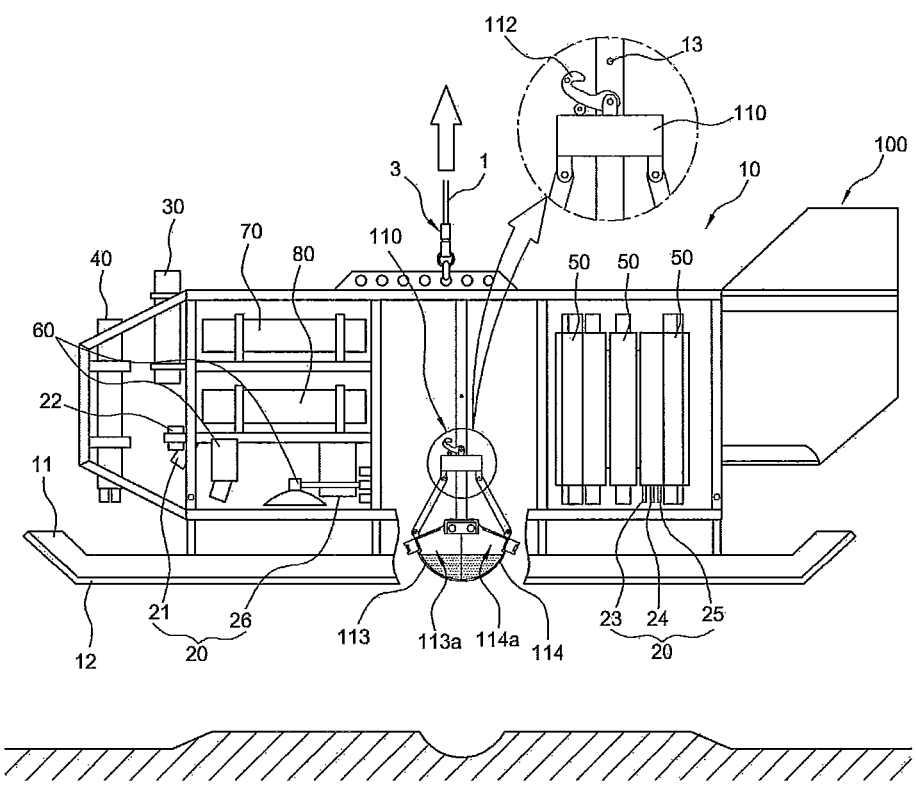
FIG. 6 is a schematic view showing when the apparatus for seabed exploration of the present invention is pulled up, after the process of FIG. 5.
Figure 7:
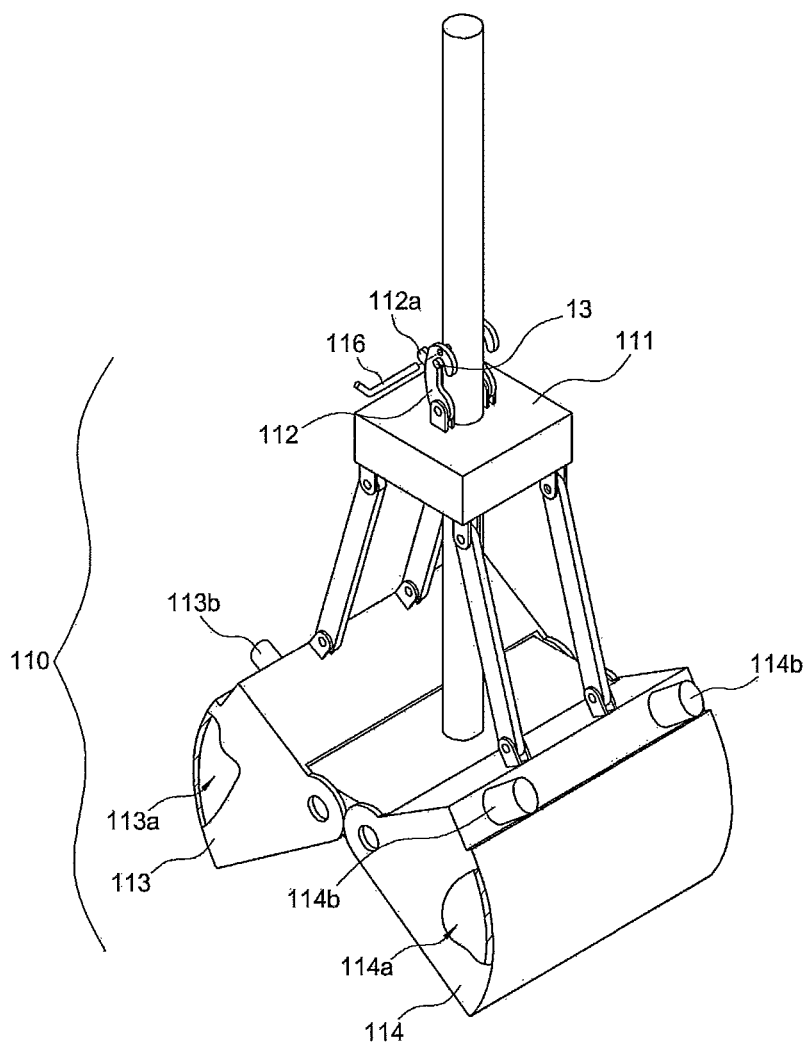
FIG. 7 is a schematic view illustrating a sediment collecting device that is a component of the present invention.

| 1. | CABLE | 2. | SHIP |
|---|---|---|---|
| 3. | SWIVEL | 10. | UNMANNED REMOTELY OPERATED VEHICLE |
| 11. | SLIDE PLATE | 12. | SHOCK-ABSORBING MEMBER |
| 13. | ANTI-DESCENDING PROTRUSION | 20. | MEASURING DEVICE |
| 21. | VIDEO CAMERA | 22. | METHANE GAS MEASURING DEVICE |
| 23. | TEMPERATURE MEASURING DEVICE | 24. | DEPTH MEASURING DEVICE |
| 25. | SALINITY MEASURING DEVICE | 26. | CAMERA |
| 30. | TRANSPONDER | 40. | PINGER |
| 50. | WATER SAMPLER | 60. | LIGHTING DEVICE |
| 70. | DATA STORAGE | 80, 90. | BATTERY |
| 100. | RUDDER | 110. | SEDIMENT COLLECTING DEVICE |
| 111. | VERTICAL MOVER | 112. | HOOK |

[Detailed Description of Main Elements] -continued

| 112a. | WEIGHT | 113. | LEFT ROTARY BUCKET |
|---|---|---|---|
| 113a. | SEDIMENT SPACE | 113b. | WEIGHT |
| 114. | RIGHT ROTARY BUCKET | 114a. | SEDIMENT SPACE |
| 114b. | WEIGHT | 115, 116. | PIN |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

However, the accompanying drawings are just an example for illustrating in detail the spirit of the present invention and the spirit of the present invention is not limited to the accompanying drawings.

The present invention relates to an apparatus for seabed exploration using an unmanned remotely operated vehicle 10 connected with a ship by a cable 1.

Therefore, the apparatus for seabed exploration of the present invention has the unmanned remotely operated vehicle 10 connected with a ship by a cable.

Further, the apparatus has a measuring device 20 that is mounted in the unmanned remotely operated vehicle 10 and senses or measures a variety of information on the seabed where the unmanned remotely operated vehicle 10 is positioned.

The unmanned remotely operated vehicle 10 or the measuring device 20 may be various types of devices and have been already known in the art, such that the detailed description of the common structure of the unmanned remotely operated vehicle 10 or the measuring device 20 is not provided.

However, the present invention has an object that makes it possible to use the apparatus for seabed exploration, such as an object that checks whether there is a gas hydrate by using the unmanned remotely operated vehicle 10 connected with the ship by the cable 1 and relatively accurately finding the position of the unmanned remotely operated vehicle 10 from the ship (the latitudinal and longitudinal positions and the underwater depth of the unmanned remotely operated vehicle).

The inventor(s) of the present invention has designed a method of using an acoustic positioning system and an echo sounder system to achieve the objects described above.

Therefore, the unmanned remotely operated vehicle 10 of the present invention is equipped with a transponder 30 of the acoustic positioning system.

Further, the unmanned remotely operated vehicle 10 is equipped with a pinger 40 that outputs signals that may be received by a receiver of the echo sounder system on the ship 2.

That is, the receiver of the acoustic positioning system finds the latitudinal position (x-coordinate) and the longitudinal position (y-coordinate) of the unmanned remotely operated vehicle 10, from the signal generated from the transponder 30 of the unmanned remotely operated vehicle 10.

Further, the receiver of the echo sounder system in the ship receives the signal generated from the pinger of the unmanned remotely operated vehicle 10, such that the underwater distance (distance between the remotely operated vehicle and the seafloor) of the unmanned remotely operated vehicle 10 is found.

Therefore, it is possible to relatively accurately find the position of the unmanned remotely operated vehicle 10.

Since the acoustic positioning system may find the position (latitudinal and longitudinal positions) of the transponder 30 on the basis of the signal outputted from the transponder 30, such that it is widely used for various industrial fields.

Accordingly, the detailed description for the structure etc. of the acoustic positioning system is not provided.

However, it is preferable to mount the transponder 30 at the upper portion of the unmanned remotely operated vehicle 10 such that the output signals are not blocked by other parts of the unmanned remotely operated vehicle 10.

However, it is impossible to locate the unmanned remotely operated vehicle 10 released under the sea by using only the acoustic positioning system.

This is because it is impossible to find how deep the unmanned remotely operated vehicle 10 is released.

In order to remove the problem, the pinger 40 that outputs signals that may be received by the receiver of the echo sounder system is mounted on the unmanned remotely operated vehicle 10 in the present invention.

The echo sounder system is usually mounted on fishing boats and used for fish finders. The method of measuring depth is to output a signal at a specific frequency (generally, 12 kHz frequency) toward the seafloor and measure the depth on the basis of the time that takes the signal to return.

In general, the signal transmitter and the receiver of the echo sounder system are implemented in a single unit.

The pinger 40 is used to show the position of a sunken ship or the position of seabed relics and outputs signals at a specific frequency.

Therefore, in the present invention, it is possible to find the position of the pinger 40 (z-coordinate of the unmanned remotely operated vehicle 10) with the echo sounder system on the ship, by making the pinger 40 output a signal at a predetermined frequency (12 kHz signal) that the receiver of the echo sounder system may receive, and mounting the pinger 40 on the unmanned remotely operated vehicle 10 (the signal transmitter of the echo sounder system on the ship is turned off (OFF-state), when the signal outputted from the pinger 40 is received by the echo sounder system).

Meanwhile, the present invention has another object that provides an apparatus for seabed exploration that may collect seabed sediments, if necessary.

The present invention has a sediment collecting device 110 that collects sediments on the seafloor, when the unmanned remotely operated vehicle 10 grounds on the seafloor, in order to achieve the object.

That is, the sediment collecting device 110 is mounted on the unmanned remotely operated vehicle 10 and may collect seabed sediments while moving with the unmanned remotely operated vehicle 10, if needed.

The sediment collecting device 110 may be implemented in various types, but is preferably implemented in the type shown in the accompanying drawings.

The sediment collecting device 110 has a vertical mover 111 that may move up/down in the unmanned remotely operated vehicle.

Further, the sediment collecting device 110 has a hook 112 that is rotatably connected to the vertical mover 111 and rotates in order not to be locked to an anti-descending protrusion 13 even if the vertical mover 111 descends, when the vertical mover 111 moves up away from the anti-descending protrusion 13, with the vertical mover 111 prevented from descending by being locked to the anti-descending protrusion 13 formed in the unmanned remotely operated vehicle 10.

Further, the sediment collecting device 110 has a left rotary bucket 113 and a right rotary bucket 114 that move up the vertical mover 111 when an upward force is applied to the unmanned remotely operated vehicle 10 that continues moving down in contact with the seafloor, are rotated in opposite directions and opened when the vertical mover 111 may not move down by the hook 112 locked to the anti-descending protrusion 13, and fill sediment spaces 113a and 14a between them with sediments by rotating toward each other and digging the sediments and closing with the edges in contact with each other such that the sediments in the sediment spaces 113a and 14a may not come out, when the vertical mover 111 moves down without influence by the anti-descending protrusion 13.

The method of rotating the hook 112 when the hook 112 moves up away from the anti-descending protrusion 13 may be implemented by using a specific device, but it may be achieved by the biased center of gravity shown in the accompanying drawings.

In the accompanying drawings, a heavy weight 112a is positioned behind the hook 112 and the center of gravity is positioned at the left of the hook 112 by the weight 112a, such that the hook 112 rotates left.

In the above description, the structure that rotates the left rotary bucket 113 and the right rotary bucket 114 toward each other when the vertical mover 111 moves down without influence by the anti-descending protrusion 13 may also be implemented by a specific device, but it may be implemented by the weight of the left rotary bucket 113 and the right rotary bucket 114, as shown in the accompanying drawings.

In the accompanying drawings, heavy weights 113b and 114b are positioned at the left rotary bucket 113 and the right rotary bucket 114, such that the left rotary bucket 113 and the right rotary bucket 114 may smoothly rotate toward each other.

It is required to operate the sediment collecting device 110 having the structure described above at the exact time, that is, the time that the sediment collecting device 110 may collect sediments, and to prevent the sediment collecting device 110 from being damaged by hitting against external objects.

Accordingly, slide plates 11 that may move up/down are disposed at the left and right lower ends of the unmanned remotely operated vehicle 10, such that they move to the upper portion of the unmanned remotely operated vehicle 10 by being pressed by the weight of the parts of the unmanned remotely operated vehicle 10, when the unmanned remotely operated vehicle 10 grounds on the seafloor.

Further, the left rotary bucket 113 and the right rotary bucket 114 are installed at the position where they may come in contact with the seafloor, only when the slide plates 11 move at a predetermined distance to the upper portion of the unmanned remotely operated vehicle 10.

That is, the sediment collecting device 110 is protected by the slide plates 11.

Obviously, it is preferable that the sediment collecting device 110 is positioned inside the unmanned remotely operated vehicle to protect the left, right, front, and rear sides as well as the lower portion of the sediment collecting device 110.

In the accompanying drawings, a pin 115 that may prevent the slide plates 11 from moving up even if a force is applied is provided, in order to prevent the slide plates 11 from moving to the upper portion of the unmanned remotely operated vehicle 10, with the apparatus for seabed exploration of the present invention placed on the ship (it is required to remove the pin 115 when releasing the unmanned remotely operated vehicle for exploration such that the slide plates may move up when coming in contact with the seafloor).

Further, a pin 116 that restricts movement such that the hook 112 and the vertical mover 111 may not move up even if an upward force is applied to the vertical mover 111 from above, and the pin 116 is removed only when the remotely operated vehicle is released into the sea for exploration such that the sediment collecting device 110 operates.

According to the method of exploring the seabed by using the apparatus for exploration of the present invention, the seabed is explored by moving down the unmanned remotely operated vehicle 10 toward the seafloor of the area to explore and recording various information on the seabed with the measuring device 20 in the unmanned remotely operated vehicle 10, in which the exploration method is implemented by locating the unmanned remotely operated vehicle 10 at predetermined latitude and longitude from the ship on the basis of the signal outputted from the transponder 30 of the acoustic positioning system in the unmanned remotely operated vehicle 10, preventing the unmanned remotely operated vehicle 10 from coming out of the area to explore by moving the ship on the basis of the location (it is possible to prevent the unmanned remotely operated vehicle 10 from coming out of the area to explore, because the unmanned remotely operated vehicle 10 moves when the ship moves), and finding the underwater depth of the unmanned remotely operated vehicle 10 by receiving the signal outputted from the pinger 40 mounted on the unmanned remotely operated vehicle 10 with the receiver of the echo sounder system on the ship.

Further, the method is to collect seabed sediments in the area, when the apparatus for exploration of the present invention grounds on the seafloor.

When the slide plates 11 ground on the seafloor, the unmanned remotely operated vehicle continues move down due to the weight of the unmanned remotely operated vehicle 10 while the slide plates 11 moves to the upper portion of the unmanned remotely operated vehicle 10.

Therefore, as the seafloor lifts up the left rotary bucket 113 and the right rotary bucket 114, the vertical mover 111 moves upward and the hook 112 rotates upward and separates from the anti-descending protrusion 13, such that the left rotary bucket 113 and the right rotary bucket 114 may rotate (as the vertical mover 111 moves down, the left rotary bucket 113 and the right rotary bucket 114 rotate toward each other, in which the left rotary bucket 113 and the right rotary bucket 114 dig the seafloor and the sediment space 113*a* and 114*a* are filled with the sediments).

It is possible to acquire the collected seabed sediments by pulling up the apparatus for exploration of the present invention in this state.

It is possible to ensure accuracy in exploration by providing a water sampler 50 that collects the seawater around the unmanned remotely operated vehicle 10, when the remotely operated vehicle 10 that is a component of the present invention is released into the sea and then moves down and reaches a predetermined position.

In this case, since the operation of the water sampler 50 may not be controlled from the ship, the water sampler 50 requires to be automatically operated, when the unmanned remotely operated vehicle 10 reaches a predetermined position.

For this configuration, the water sampler 50 may be implemented to collect a sample of the seawater by opening and closing the inlet of a collecting vessel, when a predetermined time passes after the unmanned remotely operated vehicle 10 is released under the sea or the unmanned remotely operated vehicle 10 reaches a predetermined depth.

The method of operating the water sampler when a predetermined time passes after the unmanned remotely operated vehicle is released uses a timer, in which the inlet of the collecting vessel opens when it is the time set in the timer, and then the inlet of the collecting vessel closes after a predetermined time passes (the time for the collecting vessel to be filled with the seawater passes).

Opening and closing the cover by the timer may be implemented by applying a technology that is used in various industrial fields.

The method of opening and closing the inlet of the water sampler 50 when the unmanned remotely operated vehicle 10 reaches a predetermined depth uses a depth measuring device 24.

That is, the inlet of the water sampler 50 is opened and closed by moving the cover, when the depth of water measured by the depth measuring device 24 reaches a set value.

Various devices well known in the art, such as one using water pressure, may be used for the depth measuring device 24.

The unmanned remotely operated vehicle 10 may be equipped with a camera 26 that photographs (in stop images) the area around the unmanned remotely operated vehicle 10.

Further, the unmanned remotely operated vehicle 10 may be equipped with a video camera 21 that records video, in which the video camera 21 means various video cameras well known in the art, including a camcoder.

It is possible to not only more various information, but increase accuracy in exploration, by using the camera 26 or the video camera 21.

In exploration for finding a gas hydrate, it is possible to take a picture of generation of methane gas, mounds formed on the seafloor by discharging of the methane gas, or a grouping situation of organisms using the methane gas, in images or video, by using the camera 26 or the video camera 21.

The unmanned remotely operated vehicle 10 may be equipped with a lighting device 60 and the lighting device 60 is more required when the unmanned remotely operated vehicle 10 is equipped with the camera 26 of the video camera 21, in which it is preferable to install the lighting device 60 to light the area that the camera 26 of the video camera 21 photographs.

The measuring device 20 that is a component of the present invention may be implemented to include various measuring devices to be able to measure various factors.

In detail, it may be implemented to include a methane gas measuring device 22 that senses the concentration of the methane gas around the unmanned remotely operated vehicle 10.

Further, a temperature measuring device 23 that measures temperature of the seawater may be installed.

Further, a salinity measuring device 25 that measures the salinity of the seawater may be installed.

Further, the depth measuring device 24 that measure the depth of water of the area where the unmanned remotely operated vehicle 10 is positioned may be provided.

Obviously, the accuracy may be ensured by storing, at each of a predetermined time or in real time, the data measured by the methane gas measuring device 22, the temperature measuring device 23, the salinity measuring device 25, the depth measuring device 24, and the camera 26 and the video camera 21, which are described below.

Therefore, it is preferable that the unmanned remotely operated vehicle 10 is further equipped with a data storage 70 that stores the data measured or sensed by the measuring device 20.

In this configuration, the measuring devices may be independent by being equipped with separate data storages and batteries.

In detail, for example, a data storage and a battery connected to the methane gas measuring device 22 are separately provided.

Further, a data storage and a battery connected with the camera 26 are separately provided.

Further, a data storage and a battery 90 connected with the video camera 21 are separately provided.

Obviously, the temperature measuring device 23, the depth measuring device 24, and the salinity measuring device 25 are implemented in a single unit and modulated in one container, and separate data storages and batteries may be connected with all of the temperature measuring device 23, the depth measuring device 24, and the salinity measuring device 25 (in the accompanying drawings, temperature measuring device 23, the depth measuring device 24, and the salinity measuring device 25 are installed in one container and a plurality of cylindrical water samplers 50 are arranged around the container).

In order to more increase accuracy in measurement when the measuring devices are equipped with separate data storages, the measuring devices (methane gas measuring device 22, temperature measuring device 23, salinity measuring device 25, depth measuring device 24, camera 26, and video camera 21) are all reset before being released into the sea and the timers of the methane gas measuring device 22, temperature measuring device 23, salinity measuring device 25, depth measuring device 24, camera 26, and video camera 21 is set to display the same time such that the observed data may be compared after the exploration.

When the apparatus for exploration of the present invention is used for exploration finding a gas hydrate, it is preferable to provide all of the methane gas measuring device 22, temperature measuring device 23, salinity measuring device 25, depth measuring device 24, camera 26, and video camera 21.

When the unmanned remotely operated vehicle 10 that is a component of the present invention is equipped with various components, such as electronic devices that are activated by electricity, it is required to install a battery 80 that supplies power for operating the components.

The unmanned remotely operated vehicle 10 of the present invention may be implemented in various types, but a sleigh type of unmanned remotely operated vehicle may be used to attenuate shock when it grounds on the seafloor under an unexpected situation.

In particular, it is preferable to use a sleight type of unmanned remotely operated vehicle 10, for exploration of a gas hydrate.

The sleigh type of unmanned remotely operated vehicle 10 is equipped with the slide plates 11 at the left and right lower portions.

Therefore, the sleigh type of unmanned remotely operated vehicle 10 should be very carefully loaded and unloaded on the ship and should be firmly held in order not to move when the ship moves, that is, there are various defects in use.

In order to remove the defects, a shock-absorbing member 12, such as rubber absorbs shock, may be disposed at the portion that comes in contact with the ship, in the slide plates 11, when the unmanned remotely operated vehicle 10 is placed on the ship.

When the apparatus for exploration of the present invention is used to explore a gas hydrate, it is preferable that the pinger 40 and the transponder 30 are positioned at the front upper portion of the unmanned remotely operated vehicle 10 in order not to be blocked by the other components.

The disposition is for maintaining the optimal conditions for communication between the ship 2 and the unmanned remotely operated vehicle 10.

Further, it is preferable that the methane gas measuring device 22 and the video camera 21 are disposed at the lower portion of the unmanned remotely operated vehicle 10 in order not to be blocked by the other components.

Further, it is preferable that the data storage 70 and the battery 80 are disposed at the center portion of the unmanned remotely operated vehicle 10 to be blocked and protected by the frame of the unmanned remotely operated vehicle.

Further, it is preferable that the temperature measuring device 23, the depth measuring device 24, and the salinity measuring device 25 are disposed close to each other at the rear portion of the unmanned remotely operated vehicle 10 such that temperature and salinity of the seawater may be measured and collected at very close positions.

Reference numeral '3' that is not described indicates a swivel connecting the cable 1 with the unmanned remotely operated vehicle 10 and is a device that makes rotation of unmanned remotely operated vehicle 10 free while the unmanned remotely operated vehicle 10 is moved down for exploration or detects discharging of methane gas around the seafloor.

In particular, a rudder 100 of the unmanned remotely operated vehicle 10 holds the unmanned remotely operated vehicle 10 in the current direction with respect to the activity of the current around the seafloor.

When the swivel 3 is not provided, excessive tension may be exerted in the cable 1 by the activity of the current.

The swivel 3 is composed of an upper body and a lower body, and the cable 1 is connected to the upper body and the unmanned remotely operated vehicle 10 is connected to the lower body such that the swivel may rotate, with the lower body combined with the upper body.

The apparatus for seabed exploration of the present invention uses an unmanned remotely operated vehicle connected with a ship by a cable, in which the unmanned remotely operated vehicle is equipped with a transponder of an acoustic positioning system and a pinger of an echo sounder system.

Therefore, it is possible to find the x- and y-coordinates corresponding to the position of the unmanned remotely operated vehicle on the latitude and the longitude by using the receiver of the acoustic positioning system positioned on the ship and find the z-coordinate corresponding to the underwater depth of the unmanned remotely operated vehicle by using a pinger of an echo sounder system, such that it is possible to relatively accurately locate the position of the unmanned remotely operated vehicle.

Further, it is possible to acquire various information because it is possible to collect sediments on the seafloor by grounding the unmanned remotely operated vehicle on the seafloor.

Accordingly, it is possible to use the apparatus for seabed exploration works for checking whether there is a gas hydrate while using the unmanned remotely operated vehicle connected with the ship by the cable, and acquire very reliable data.

The unmanned remotely operated vehicle is further equipped with a water sampler that collects a sample of the seawater around the unmanned remotely operated vehicle, and the water sampler collects a sample of the seawater by opening and closing an inlet of a collecting vessel, when a predetermined time passes after the unmanned remotely operated vehicle is released under the sea or the unmanned remotely operated vehicle reaches a predetermined depth, in which the water sampler may collect an example of the seawater at the exact position.

It is possible to implement more various exploration as well as increase accuracy in the exploration, when the unmanned remotely operated vehicle is further equipped with a camera that photographs the area around the unmanned remotely operated vehicle or a video camera recording video.

That is, the measuring device may have a methane gas measuring device sensing the concentration of methane gas around the area where the unmanned remotely operated vehicle is positioned, a temperature measuring device that measures the temperature of the seawater, and a salinity measuring device that measures salinity of the seawater, in which it is possible to acquire very high accuracy in exploring a gas hydrate.

When the unmanned remotely operated vehicle may be implemented in a sleigh type with slide plates at the left and right lower ends and the sediment collecting device is implemented to operate only when the slide plates move to the upper portion of the unmanned remotely operated vehicle, it is possible to prevent the sediment collecting device from operating in an area where it may not collect seabed sediments.

Further, when a shock-absorbing member that absorbs shock is disposed at the portion that comes in contact with the ship, in the slide plates, it is easy to move the remotely operated vehicle by moving the ship, the unmanned remotely operated vehicle carries well shock due to collision with the seafloor and may be easily placed on the ship.

What is claimed is:

1. An apparatus for seabed exploration, which is equipped with a remotely operated vehicle, comprising:
   an unmanned remotely operated vehicle connected with a ship by a cable;
   an acoustic positioning system comprising:
      a receiver positioned on the ship; and
      a transponder mounted on the unmanned remotely operated vehicle configured to send a transponder signal to the receiver from which the acoustic positioning system can determine a latitudinal position and a longitudinal position of the unmanned remotely operated vehicle;
   a pinger mounted on the unmanned remotely operated vehicle and outputting a pinger signal that is received by a receiver of an echo sounder system mounted on the ship and the echo sounder system utilizes the pinger signal to determine an underwater depth of the unmanned remotely operated vehicle;
   a measuring device mounted on the unmanned remotely operated vehicle and sensing or measuring various information on the seabed where the unmanned remotely operated vehicle is positioned; and
   a sediment collecting device collecting sediments of the seafloor, when the unmanned remotely operated vehicle grounds on the seafloor,
   wherein the apparatus checks whether there is gas hydrate using the measuring device and determines a position of the unmanned remotely operated vehicle using the acoustic positioning system and the echo sounder system if gas hydrate is located.

2. The apparatus for seabed exploration of claim 1, wherein the sediment collecting device includes:
   a vertical mover moving up/down in the unmanned remotely operated vehicle;
   a hook rotatably connected to the vertical mover and rotating in order not to be locked to an anti-descending protrusion even if the vertical mover descends, when the vertical mover moves up away from the anti-descending protrusion, with the vertical mover being prevented from descending by being locked to the anti-descending protrusion formed in the unmanned remotely operated vehicle; and
   a left rotary bucket and a right rotary bucket moving up the vertical mover when an upward force is applied to the unmanned remotely operated vehicle that continues moving down in contact with the seafloor, rotated in opposite directions and opened when the vertical mover moves down by the hook locked to the anti-descending protrusion, and filling sediment spaces between them with sediments by rotating toward each other and digging the sediments and closing with the edges in contact with each other such that the sediments in the sediment spaces comes out, when the vertical mover moves down without influence by the anti-descending protrusion.

3. The apparatus for seabed exploration of claim 2, wherein slide plates that move up/down are disposed at the left and right lower ends of the unmanned remotely operated vehicle, such that they move toward an upper portion of the unmanned remotely operated vehicle by being pressed by the weight of the parts of the unmanned remotely operated vehicle, when the unmanned remotely operated vehicle grounds on the seafloor, and
   the left rotary bucket and the right rotary bucket are installed at the position where they come in contact with the seafloor, only when the slide plates move at a predetermined distance to the upper portion of the unmanned remotely operated vehicle.

4. The apparatus for seabed exploration of claim 3, wherein a shock-absorbing member that absorbs shock is disposed at the portion that comes in contact with the ship, in the slide plates, when the unmanned remotely operated vehicle is placed on the ship.

5. The apparatus for seabed exploration of claim 1, wherein the unmanned remotely operated vehicle is further equipped with a water sampler that collects a sample of the seawater around the unmanned remotely operated vehicle, the water sampler collecting a sample of the seawater by opening and closing an inlet of a collecting vessel, when a predetermined time passes after the unmanned remotely operated vehicle is released under the sea or the unmanned remotely operated vehicle reaches a predetermined depth.

6. The apparatus for seabed exploration of claim 1, wherein the measuring device includes a methane gas measuring device sensing the concentration of methane gas around the unmanned remotely operated vehicle, a temperature measuring device measuring the temperature of the seawater, a salinity measuring device measuring salinity of the seawater, a depth measuring device measuring the depth of the seabed where the unmanned remotely operated vehicle is positioned, a camera photographing the area around the unmanned remotely operated vehicle in stop images, and a video camera taking video.

7. The apparatus for seabed exploration of claim 6, wherein a data storage and a battery connected to the methane gas measuring device are separately provided, data storages and batteries connected to the temperature measuring device and the salinity measuring device are separately provided, a data storage and a battery connected with the camera are separately provided, and a data storage and a battery connected to the video camera are separately provided.

8. A method of exploring seabed by using an unmanned remotely operated vehicle connected with a ship by a cable, wherein the seabed is explored by moving down an unmanned remotely operated vehicle toward the seafloor of the area to explore and recording various information on the seabed with a measuring device in the unmanned remotely operated vehicle to determine whether gas hydrate is present, the unmanned remotely operated vehicle at predetermined latitude and longitude is located from the ship when it is determined that gas hydrate is present on the basis of the signal outputted from a transponder of an acoustic positioning system in the unmanned remotely operated vehicle, the unmanned remotely operated vehicle is prevented from coming out of the area to explore by moving the ship on the basis of the location, the underwater depth of the unmanned remotely operated vehicle is found when it is determined that gas hydrate is present by receiving a signal outputted from a pinger mounted on the unmanned remotely operated vehicle with a receiver of an echo sounder system on the ship, and the unmanned remotely operated vehicle grounds on the seafloor and collects sediments on the seafloor with a sediment collecting device mounted on the unmanned remotely operated vehicle.

9. The method of exploring seabed of claim 8, wherein the sediment collecting device includes:

a vertical mover moving up/down in the unmanned remotely operated vehicle;

a hook rotatably connected to the vertical mover and rotating in order not to be locked to an anti-descending protrusion even if the vertical mover descends, when the vertical mover moves up away from the anti-descending protrusion, with the vertical mover being prevented from descending by being locked to the anti-descending protrusion formed in the unmanned remotely operated vehicle; and a left rotary bucket and a right rotary bucket moving up the vertical mover when an upward force is applied to the unmanned remotely operated vehicle that continues moving down in contact with the seafloor, rotated in opposite directions and opened when the vertical mover moves down by the hook locked to the anti-descending protrusion, and filling sediment spaces between them with sediments by rotating toward each other and digging the sediments and closing with the edges in contact with each other such that the sediments in the sediment spaces come out, when the vertical mover moves down without influence by the anti-descending protrusion.

* * * * *